United States Patent [19]
Cetrulo, Jr.

[11] 3,921,375
[45] Nov. 25, 1975

[54] TOMATO HARVESTING HEADER ATTACHMENT FOR POTATO COMBINE

[75] Inventor: Frank A. Cetrulo, Jr., Fort Thomas, Ky.

[73] Assignee: National Factors, Inc., Cincinnati, Ohio

[22] Filed: Feb. 25, 1974

[21] Appl. No.: 445,213

[52] U.S. Cl. ................................. 56/327 R; 171/31
[51] Int. Cl.² ........................................ A01D 46/00
[58] Field of Search ........ 56/327 R; 171/14, 27, 28, 171/31, 42, 71, 88

[56] References Cited
UNITED STATES PATENTS

| | | | |
|---|---|---|---|
| 3,078,926 | 2/1963 | Ries et al. ............................... | 171/14 |
| 3,106,249 | 10/1963 | Zachery ................................ | 171/14 |
| 3,437,151 | 4/1969 | Button .......................... | 56/327 R X |
| 3,624,990 | 12/1971 | Sinden et al. ...................... | 56/327 R |

*Primary Examiner*—J. N. Eskovitz
*Attorney, Agent, or Firm*—Leo Gregory

[57] ABSTRACT

A tomato harvesting header attachment representing an improvement as an attachment for a potato combine and consisting of a pair of vertically spaced conveyor structures having their adjacent runs moving in the direction of the combine, the lower of said conveyor structures having vine-cutting means, the conveyor belts of said conveyor structures having upstanding resilient fingers in spaced relation to one another to hold vines and tomatoes therebetween free from relative movement and an elevating conveyor structure forming an extension of said underlying conveyor structure.

1 Claim, 6 Drawing Figures

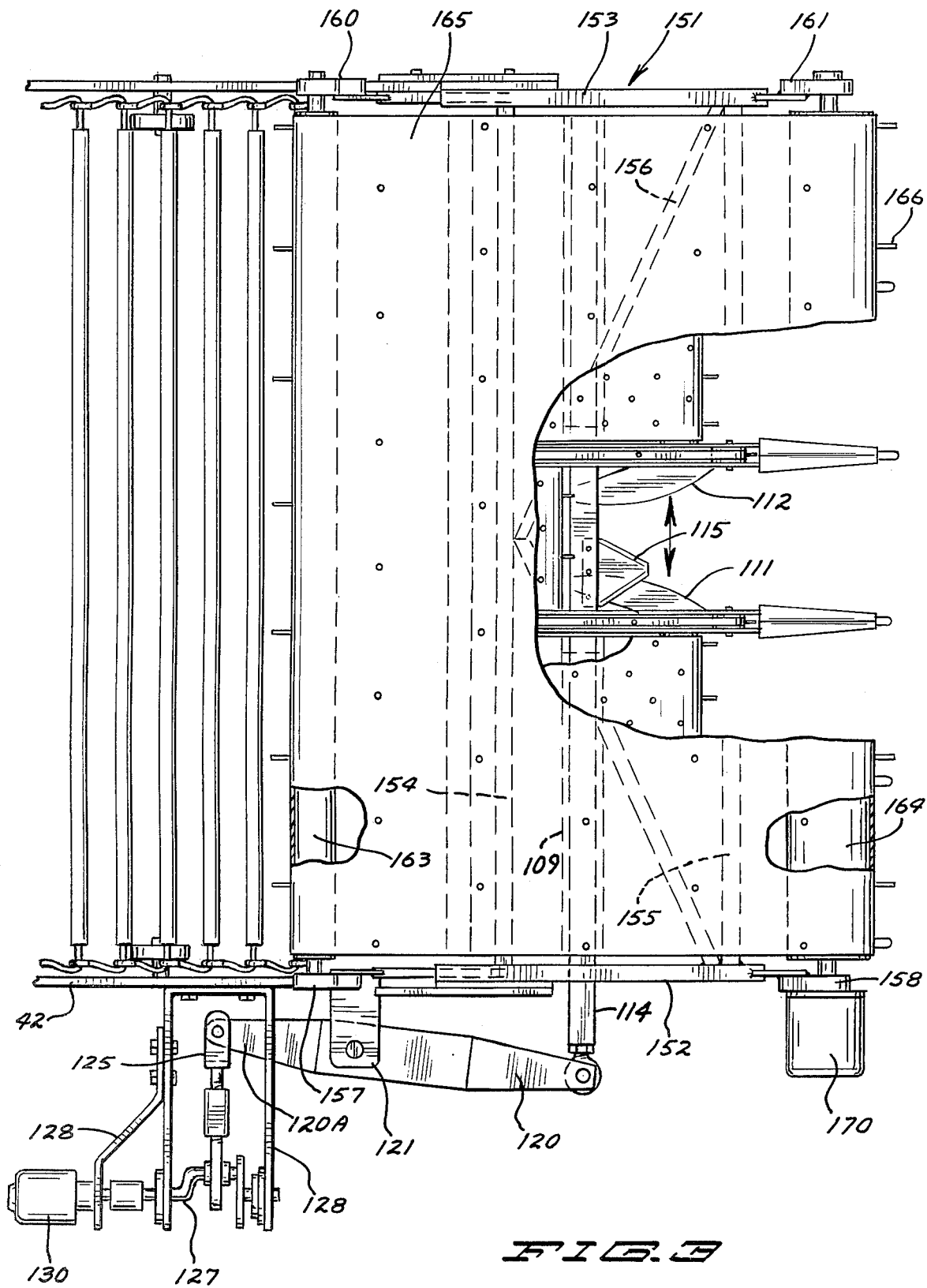

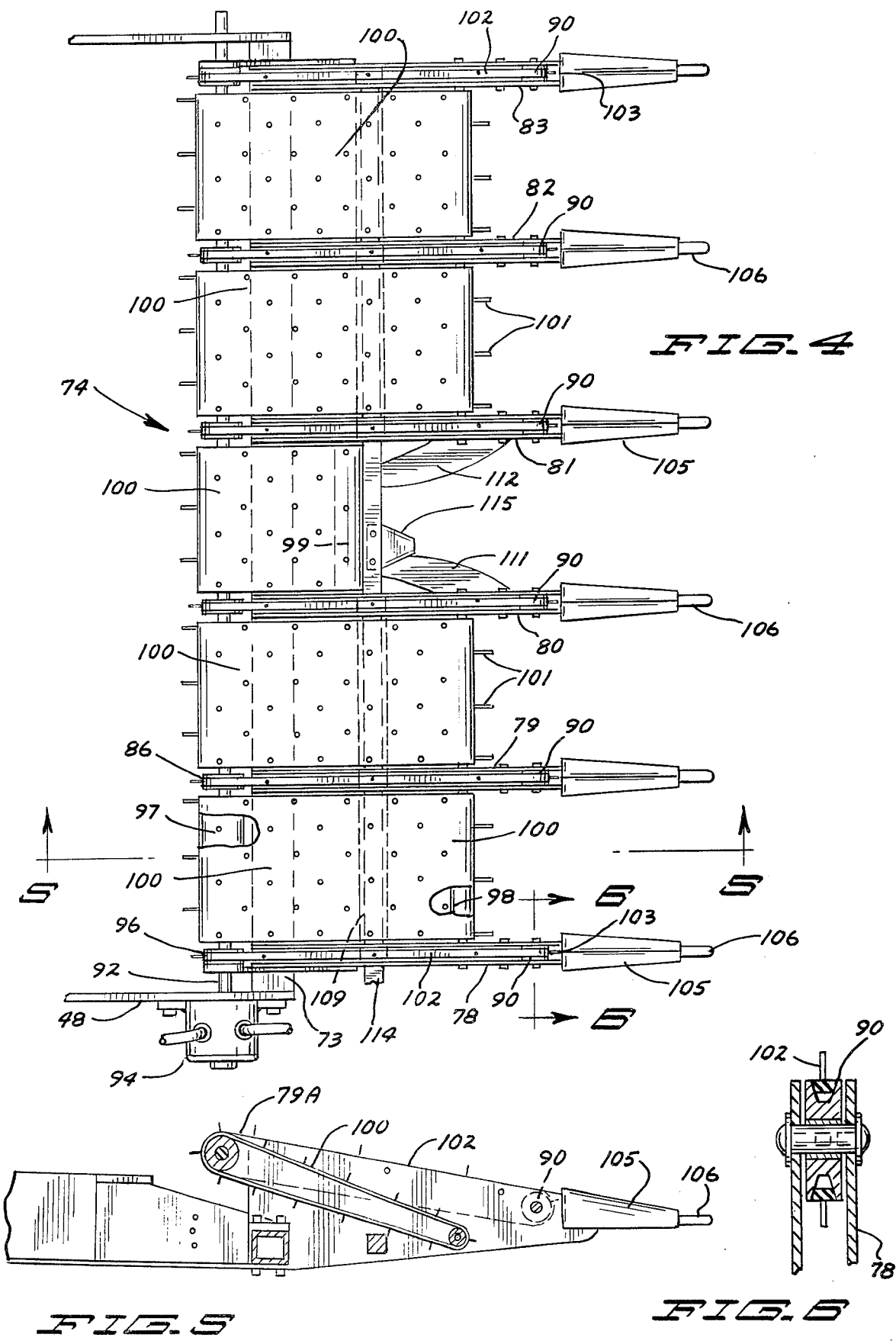

TOMATO HARVESTING HEADER ATTACHMENT FOR POTATO COMBINE

BACKGROUND AND SUMMARY OF THE INVENTION

The apparatus comprising the subject matter of the invention herein consists of a header attachment for a potato combine for harvesting tomatoes and provides a greater economic use for the basic combine structure.

It is desirable to have a header attachment for a combine such as a potato combine which header attachment is particularly arranged and constructed to lift up a tomato vine in the field, sever the vine from its root structure and position the vine onto the conveyor whereby the vine is picked up in a substantially upright position and conveyed without damage to the tomatoes by bruising either by engagement of the tomatoes with one another or by the action of the conveyor structure.

It is an object of the invention herein therefor to provide an apparatus which can be attached or mounted onto a potato combine to harvest a tomato crop.

It is a further object of the invention herein to provide a mechanical tomato harvesting apparatus as an attachment for a potato combine to appreciably reduce the labor cost of harvesting tomatoes and to make it economically feasible to harvest tomatoes of a size which would be unprofitable to harvest by hand.

More specifically, it is an object of this invention to provide a header attachment for a potato combine which header attachment comprises a pair of vertically spaced conveyor structures having their adjacent runs moving in the direction of the combine, the lower of said conveyor structures carrying vinecutting means and the conveyors of said conveyor structures having upstanding resilient fingers to hold the vines and tomatoes on the vines free from relative movement and an elevating conveyor structure forming an extension of the lower of said conveyor structures.

These and other objects and advantages of the invention will be set forth in the following description made in connection with the accompanying drawings in which like reference characters refer to similar parts throughout the several views and in which:

FIG. 1 is a view in side elevation of a harvester showing the invention herein in connection therewith and with a portion thereof being broken away, FIG. 2 is a broken view in side elevation on an enlarged scale showing the structure comprising the invention herein, FIG. 3 is a broken view on an enlarged scale substantially in top plan as indicated by line 3—3 of FIG. 2, FIG. 4 is a view on an enlarged scale substantially in top plan taken on line 4—4 of FIG. 2 as indicated, FIG. 5 is a broken view in vertical section taken on line 5—5 of FIG. 4 as indicated, and FIG. 6 is a broken view on an enlarged scale in vertical section showing a detail of structure taken on line 6—6 of FIG. 4 as indicated.

DESCRIPTION OF A PREFERRED EMBODIMENT

Figure 1:
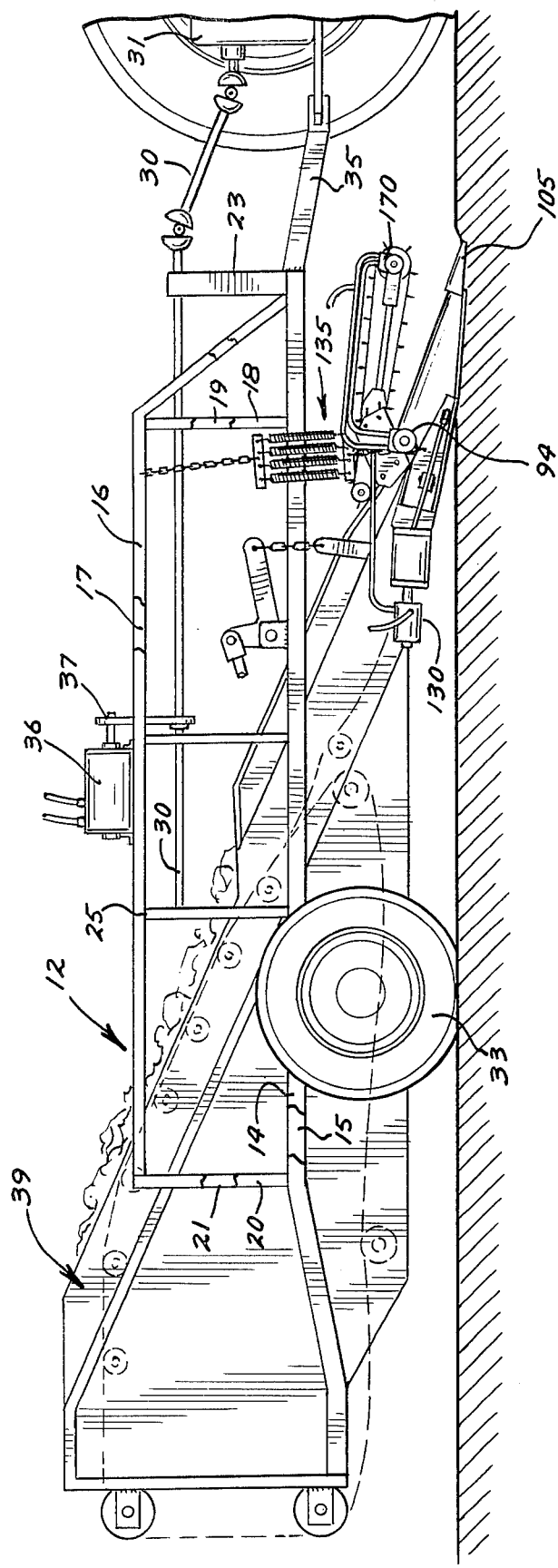

Referring to the drawings, a harvester 10 of a known design is indicated embodying the basic structure of a potato harvester. Only so much of said harvester is described as is believed necessary to support a sufficient description of the apparatus in connection therewith which comprises the subject matter of the invention herein.

Said harvester 10 as here shown comprises a basic frame 12 having a pair of spaced bottom frame members 14 and 15 and vertically aligned therewith, a pair of upper frame members 16 and 17 supported by a pair of upstanding forward end frame members 18 and 19 and by corresponding rearward end frame members 20 and 21.

Forwardly of said members 18 and 19 and upstanding from the forward end portions of said frame members 14 and 15 is an inverted U-shaped frame portion 23 and at the rear central portion of said frame 12 is a like upstanding supporting frame 25.

Appropriately supported by said frame members 23 and 25 is a power take-off shaft 30 running to a tractor 31 and having a conventional operating engagement therewith.

Said frame 12 is supported rearwardly by a pair of wheels 33 and is forwardly supported by a hitch 35 running to said tractor 31.

Suitably carried by said frame members 16 and 17 is a hydraulic pump or motor 36 driven by a belt 37 running over suitable pulleys 38 and 40 respectively carried by said motor 36 and said Brown take-off shaft 30.

Conventionally mounted at the rear portion of said frame 12 is an elevating conveyor 39 and the same may have an association with a cross conveyor not here shown for a side discharge.

Carried intermediate said frame 12 and conventionally mounted thereon and delivering to said conveyor 39 is an intermediate elevating conveyor 45 comprising side frame members 48 and 49 which are suitably swingably supported adjacent their rear end portions by a cross member 52 carried by said frame members 14 and 15 and said frame members 48 and 49 have mounted therebetween in a known manner an endless chain or flight 50.

Said frame members 48 and 49 forwardly thereof each have an upstanding arm 56 and 57 which are each connected by a like chain 59 to a like crank arm 60 respectively secured to a shaft 62 which is journaled at its ends in brackets 63 respectively carried by said frame members 14 and 15. Only the elements adjacent the frame member 14 are shown. Operatively rotating said shaft 62 is a crank 65 secured to a piston 66 of a hydraulic cylinder 67 suitably mounted by supporting brackets 69 carried by said frame member 14 is a known manner. Thus said piston 66 by means of the linkage members described adjustably supports or carries the forward end portion of said conveyor 45.

Extending between said frame members 48 and 49 forwardly of said endless chain 50 is a supporting cross member 73.

Extending forwardly of said cross member 73 as shown in FIG. 4 and secured thereto as by welding is a lower tomato pickup conveyor 74 comprising pairs of closely transversely spaced triangular shaped frame members 78, 79, 80, 81, 82 and 83. Pulleys 90 in the conventional manner as indicated in FIG. 6 are suitably mounted at the forward end portions of said frame members journaled between the respective pairs of said frame members. Said frame members are here shown having an upper rearward projecting portion as indicated and represented by 79a. Disposed through said projecting portions by being journaled therein is a shaft 92 operatively connected with a hydraulic motor 94 at one extended end thereof as indicated and which will be suitably supported and which has a reservoir 95 in connection therewith. Carried on said shaft between each pair of said frame members is a driving pulley 96 and said shaft has an enlarged driving roller 97 integral therewith between each adjacent pairs of said frame members.

Idler rollers 98 are journaled between the frame members 78 and 79, 79 and 80, 81 and 82, and between 82 and 83. A corresponding idler roller 99 is mounted between the frame members 80 and 81 intermediate thereof and here shown in dotted lines.

Conveyor belts 100 shown having upstanding spaced resilient fingers 101 pass over said driving rollers 97 and their respective idler rollers. Passing over each driving pulley 96 and its corresponding idler pulley 90 is a relatively narrow conveyor belt 102 having spaced resilient fingers 103 upstanding therefrom.

It will be noted from FIG. 5 that the conveyors having the belts 100 are at a steeper angling elevation than the conveyors having the belts 102.

Carried at the forward free end of each pair of said frame members is a shroud 105 having a suitable runner 106 projecting forwardly thereof for the purpose of lifting tomato vines.

Extending transversely to have its inner end portion disposed between the frame members 80 and 81 as indicated in FIGS. 3 and 4 and somewhat forwardly of the conveyor 100 is a tubular shaft 109. Mounted on said shaft and secured to the adjacent frame members 80 and 81 are a pair of forwardly diverging blade members 111 and 112. Extending through said tubular member 109 is a reciprocating sickle operating bar 114 carrying a suitable sickle blade member or sickle 115 mounted to have an operatively cutting engagement with said blades 111 and 112 to shear the stems of tomato vines.

As shown in FIG. 3, said rod 114 is connected to a pitman arm 120 which is pivotally supported intermediate its ends by a plate bracket 121 and is secured at its free end 120a by an arm 125 connected to a crank 127 suitably mounted onto a bracket 128. Also carried by said bracket is a hydraulic motor 130 connected to and driving the shaft of said crank 127.

Figure 2:
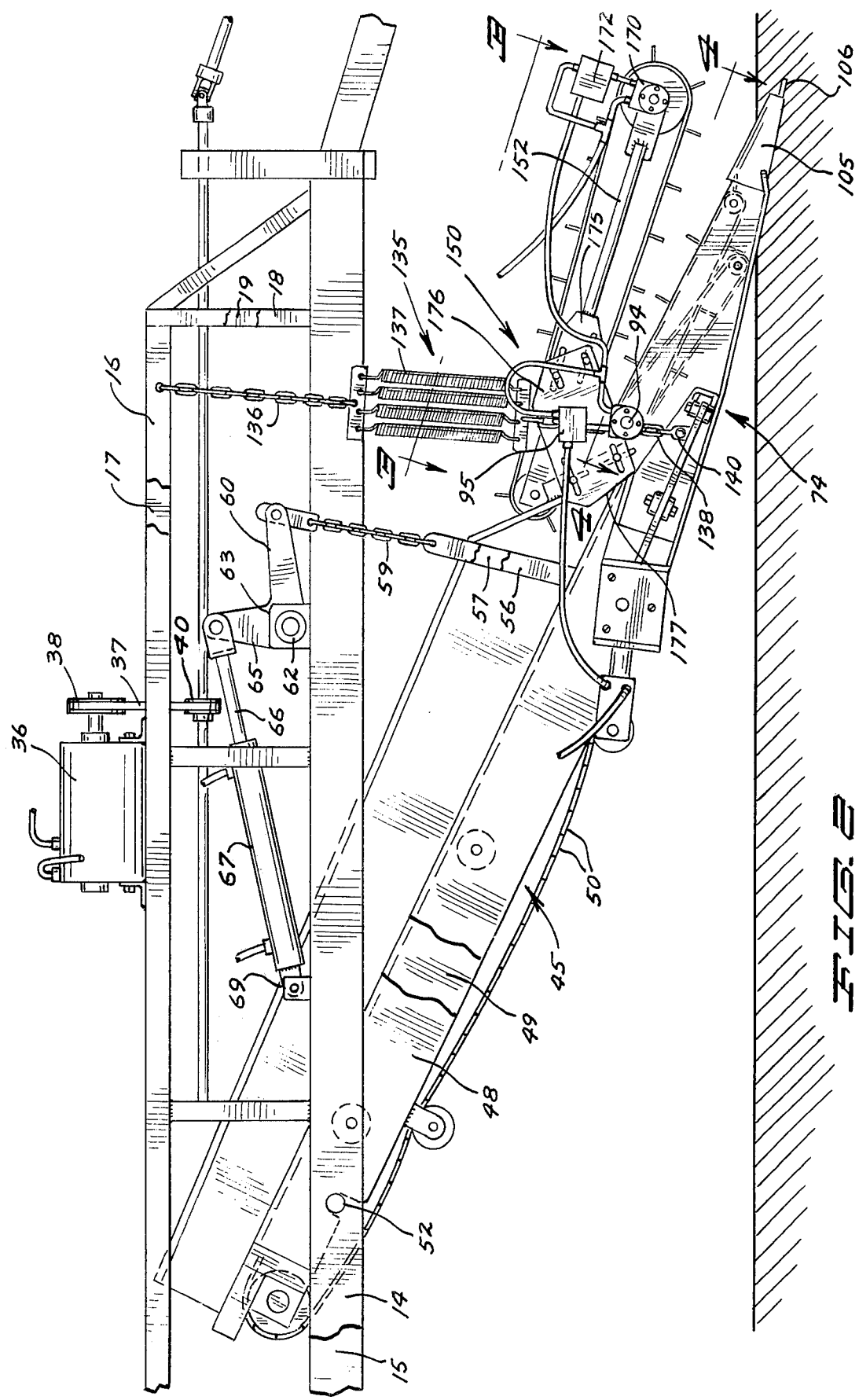

Resiliently holding said tomato pickup conveyor 74 in suspension are a pair of resilient suspension members depending from the forward end portions of the frame members 16 and 17 and being secured to the outer side walls of said members 78 and 83. Only one of these members; namely, 135, as representative of both and as shown in FIG. 2, is here described.

Said suspension member 135 as here shown comprises a chain 136 linked to the forward portion of the frame member 16 and having depending therefrom a plurality of coil spring members disposed between a pair of end bars all indicated by 137 and a lower chain 138 securing said spring member to a suitable shackle 140 secured to the outer side wall of said frame member 78.

The hydraulic cylinder 67 is used to fix the position of the conveyor 45 and of the tomato pickup conveyor 74 to a suitable ground relationship. The spring members of which 135 is above described act as shock absorbers whereby when said conveyors are jarred or bounce upwardly because of the terrain, the downward fall of said conveyor is suitably cushioned.

In spaced relation to said lower tomato pickup conveyor 74 is an upper conveyor 150.

Said upper conveyor 150 comprises a substantially rectangular frame 151 having longitudinal side members 152 and 153, cross members 154 and 155 and a substantially V-shaped bracing member 156. Said frame member 152 has bearing blocks 157 and 158 at its respective ends and said side frame member 153 has at its ends corresponding bearing blocks 160 and 161.

A conveyor shaft roller 163 has its reduced ends journaled in said bearing blocks 157 and 160. A conveyor roller 164 and its reduced ends journaled in said bearing blocks 158 and 161. Passing over said rollers 163 and 164 is an endless belt 165 here shown as a solid belt having resilient fingers 166 in spaced relation upstanding therefrom. The lower run of said belt 165 and the upper runs of the belts of said lower conveyor 74 will move in the same direction toward the elevating conveyor 45.

A hydraulic motor 170 is suitably mounted onto said frame member 152 adjacent the bearing block 158 having a driving connection with said roller 164 and in connection with said motor 170 is a reservoir 172.

Said upper conveyor 150 is supported in a cantilevered position in spaced relation above said lower conveyor 74. Said side frame member 152 carries a flat plate member 175 integral therewith. A second flat plate member 176 has a depending portion 177 secured to the outer side of said frame member 78. Said plate members 175 and 176 are suitably slotted to overlie one another and be adjustably positioned relative to one another to be bolted together for suitably adjustably positioning said upper conveyor 150 with reference to said lower conveyor 74 in accordance with the size of the vines of the tomato crop to be harvested. The opposite side of said conveyor not here shown will be supported in like manner and further description is not believed necessary.

The hydraulic motor or pump 36 is regarded as a primary power source and the hydraulic motors 94, 130 and 170 are regarded as auxiliary hydraulic motors which will be conventionally connected by appropriate fluid lines with said motor 36 with all of said lines not being here shown but the use in connection of which is conventional and well known in the art.

OPERATION

The essential novelty of the invention herein lies in utilizing a conventional potato harvester modifying the header section thereof for harvesting tomatoes by the substitution of the structure herein described and claimed.

Tomato vines in the field lying on the ground and the vines of different varieties of tomatoes will have different varieties of height. The upper and lower conveyors 150 and 74 will be spaced apart by adjustment of the conveyor 150 in accordance with the size of the vines of a given crop to have the vines carried between the conveyors. Said upper conveyor 150 is adjusted as to its height by the relationship of the plate members 175 and 176.

Tomatoes are commonly planted in rows six feet apart. The harvester will pass down the field with the center of the harvester, namely the frame members 80 and 81, having the row of vines therebetween. The vines lay over at either side for some distance such as for a span of some six feet. Hence a sixfoot width of conveyor is commonly required.

The runners 106 and their respective shrouds 105 pass under the vines to lift the same. The upper runs of the conveyor belts 100 and the lower run of the conveyor belt 165 with their respective projecting resilient fingers pick up the vines and raise them off of the ground so that the vines are supported between said conveyors at the time that the stem is cut by the sickle 115. Said conveyor belts 165 and 100 respectively continue to carry the vines and the tomatoes thereon in a relatively stationary position with the tomatoes on the vines being, for the most part, nested between the respective resilient fingers. With there being no relative movement of the tomato vines or tomatoes with respect to the conveyor belts, the tomatoes avoid becoming bruised or damaged.

The lower run of the upper conveyor 150 tends to support the tomato vines in a raised position as the root or stem of the vine is being cut. The two conveyors, 150 and 74 by their cooperative relationship carry the vines and the tomatoes thereon upwardly to deposit the same onto the elevating conveyor 45 and from there the tomatoes pass to the uppermost conveyor 39 from which conveyor a cross conveyor may be used to deliver the tomatoes onto a suitable conveyance such as a truck body.

Operating power is provided by the power take-off shaft 30 connected to a power source of the tractor used to pull the harvester.

Said power take-off shaft drives the primary hydraulic motor or pump 36 which in turn operates the auxiliary hydraulic motors 94, 130 and 170 for operation of the conveyors 74 and 150 and of the sickle reciprocating bar 114.

As above described, the hydraulic cylinder 67 is operated to adjust the conveyor 45 with respect to its distance from the ground upon which the harvester will be operated.

The resilient suspension member 135 cushions the rise and fall of the conveyor 145 as the harvester moves down the field in operation.

The apparatus as described herein has proved to be very successful in operation.

It will of course be understood that various changes may be made in form, details, arrangement and proportions of the parts without departing from the scope of the invention herein which, generally stated, consists in an apparatus capable of carrying out the objects above set forth, in the parts and combinations of parts disclosed and defined in the appended claims.

What is claimed is:

1. A tomato harvesting header attachment for a potato combine, having in combination a frame member comprising a potato combine, an elevating conveyor carried by said combine, a tomato pickup conveyor extending forwardly of said elevating conveyor in operative relationship thereto and comprising spaced upstanding resilient fingers, tomato-vine cutting means carried by said pickup conveyor forwardly thereof, an elevated conveyor comprising spaced upstanding resilient fingers spaced above said tomato pickup conveyor and having its lower run extending the length of and moving in the direction of the upper run of said tomato pickup conveyor spaced therebelow and cooperating therewith to engage and elevate tomato vines therebetween, means supporting said elevated conveyor in spaced relation to said tomato pickup conveyor, power means carried by said combine operating said elevated conveyor, said conveyor supporting means comprising a pair of slotted overlying plate members, means adjustably securing said plate members together, one of said plate members being carried by said elevated conveyor, and the other of said plate members being carried by said tomato pickup conveyor.

* * * * *